United States Patent
Lee et al.

(10) Patent No.: US 7,116,386 B2
(45) Date of Patent: Oct. 3, 2006

(54) LIQUID CRYSTAL DISPLAY DEVICE WITH A STRUCTURE RECEIVING A BACK LIGHT ASSEMBLY AND A DISPLAY UNIT

(75) Inventors: Ik-Soo Lee, Gyeonggi-do (KR);
Jong-Ho Won, Gyeonggi-do (KR);
Choong-Seob Oh, Gyeonggi-do (KR);
Yoon-Soo Kwon, Gyeonggi-do (KR);
Jin-Ho Ha, Gyeonggi-do (KR)

(73) Assignee: Samsung Electronics Co. Ltd., Suwon (KR)

(*) Notice: Subject to any disclaimer, the term of this patent is extended or adjusted under 35 U.S.C. 154(b) by 0 days.

(21) Appl. No.: 10/886,549

(22) Filed: Jul. 9, 2004

(65) Prior Publication Data

US 2004/0246401 A1    Dec. 9, 2004

Related U.S. Application Data

(63) Continuation of application No. 09/732,769, filed on Dec. 11, 2000, now Pat. No. 6,762,807.

(30) Foreign Application Priority Data

Dec. 9, 1999    (KR) ............................ P 1999-56260
Oct. 23, 2000   (KR) ............................ P 2000-62369

(51) Int. Cl.
*G02F 1/1333*    (2006.01)
(52) U.S. Cl. ........................................ 349/58; 362/633
(58) Field of Classification Search ............ 349/58–60, 349/65; 362/632–634
See application file for complete search history.

(56) References Cited

U.S. PATENT DOCUMENTS

| | | | |
|---|---|---|---|
| 5,334,993 A | 8/1994 | Okajima et al. | 345/102 |
| 5,422,751 A | 6/1995 | Lewis et al. | 349/59 |
| 5,570,267 A | 10/1996 | Ma | 361/681 |
| 5,654,779 A | 8/1997 | Nakayama et al. | 349/58 |
| 5,815,227 A | 9/1998 | Lee | 349/67 |
| 5,946,061 A | 8/1999 | Kurihara et al. | 349/58 |
| 5,986,726 A | 11/1999 | Murai | 349/59 |
| 6,195,148 B1 | 2/2001 | Sasuga et al. | 349/149 |
| 6,292,239 B1 | 9/2001 | Nagamura et al. | 349/58 |
| 6,295,103 B1* | 9/2001 | Yamatani et al. | 349/58 |
| 6,392,723 B1 | 5/2002 | Sugiyama et al. | 349/58 |
| 6,411,501 B1 | 6/2002 | Cho et al. | 349/58 |
| 6,433,773 B1* | 8/2002 | Hasuda | 345/156 |
| 6,452,649 B1 | 9/2002 | Ono et al. | 349/61 |
| 6,480,245 B1 | 11/2002 | Sakamoto et al. | 349/59 |

* cited by examiner

*Primary Examiner*—Andrew Schechter
(74) *Attorney, Agent, or Firm*—F. Chau & Associates, LLC

(57) ABSTRACT

A receptacle assembly that receives a back light assembly and a display unit of a liquid crystal display device is disclosed. The receptacle assembly for receiving the back light assembly comprises a first receptacle module and a second receptacle module engaged with the rear surface of the first receptacle module to support the first receptacle module. The first receptacle module and the second receptacle module are formed of plastic and metal respectively. Therefore, the distortion that can be generated by the exterior impact and the vibration and the deflection due to the heat can be prevented. Further, the productivity is improved by simplifying the engaging structure of the receptacle assembly, and the size stability is improved.

6 Claims, 19 Drawing Sheets

LIQUID CRYSTAL DISPLAY DEVICE WITH A STRUCTURE RECEIVING A BACK LIGHT ASSEMBLY AND A DISPLAY UNIT

CROSS REFERENCE

This application is a continuation application of Applicant's U.S. patent application Ser. No. 09/732,769 filed on Dec. 11, 2000 now U.S. Pat. No. 6,762,807.

BACKGROUND OF THE INVENTION

1. Field of the Invention

The present invention relates to a liquid crystal display device, and more particularly to a liquid crystal display device that can minimize the size of the liquid crystal display device by modifying the structure of a receptacle assembly for receiving a back light assembly and a display unit of the liquid crystal display device.

2. Description of the Related Art

Recently, information processing devices have been developed so as to have various shapes, various functions, and rapid information processing speeds. The information which has been processed by such an information processing device has electrical signals. A display device that functions as an interface is usually used for confirming the information processed by the machine with the naked eye.

Recently, a liquid crystal display device has developed to be lighter and smaller than a display device of a CRT type and to have full spectrum of colors and high resolutions. As the result, a liquid crystal device has been widely used as a monitor of a computer, a television, and a display device of another information processing device.

A liquid crystal display device applies a voltage to an electrode to change the molecular arrangement of the liquid crystal layer. The liquid crystal display device changes the optical properties of liquid crystal layers that pass light according to the molecular arrangement, and uses the modulation of the light of the liquid crystal cells.

Liquid crystal display devices can be categorized into a TN (Twisted Nematic) type and an STN (Super-Twisted Nematic) type. Further, liquid crystal display devices can also be categorized into an active matrix display type that uses a switching device and a TN liquid crystal and a passive matrix display type that uses an STN liquid crystal according to the driving methods.

The active matrix display type is used in a TFT-LCD, and drives an LCD by using a TFT as a switch. The passive matrix display type does not use any transistors, and thus does not need complex circuits that are related to a transistor.

Further, according to the light source, liquid crystal display devices are categorized into a transmission-type liquid crystal display device that uses a back light and a reflection-type liquid crystal display device that uses an exterior light source.

The transmission-type liquid crystal display unit is heavy and voluminous because of the back light, but is widely used because it can be used anywhere without considering the ambient light.

FIG. 1 is an exploded perspective view for showing a conventional liquid crystal display device. FIG. 2 is a cross-sectional view for showing the assembled liquid crystal display device of FIG. 1.

Referring to FIGS. 1 and 2, the liquid crystal display device 600 comprises a liquid crystal display module 700 for displaying a screen by applying a video signal, and a front case 800 and a rear case 900 that receive the liquid crystal display module 700.

The liquid crystal display module 700 comprises a display unit 710 that comprises a liquid crystal display panel. The display unit 710 comprises a liquid crystal display panel 712, an integrated printed circuit board 714, a data side tape carrier package 716, and a gate side flexible circuit board 718 which is manufactured by a COF method.

The liquid crystal panel 712 comprises a thin film transistor substrate 712a, a color filter substrate 712b, and a liquid crystal layer therebetween (not shown).

The thin film transistor substrate 712a is a transparent glass substrate in which thin film transistors of the matrix type are formed. A data line is connected to source terminals of the thin film transistors, and a gate line is connected to gate terminals. A pixel electrode of indium tin oxide (ITO), which is transparent conductive material, is formed in the drain terminal.

If electrical signals are inputted to the data line and the gate line, the electrical signals are inputted to the source terminals and the gate terminals of the thin film transistors. The thin film transistors are turned on or off by the inputting of the electrical signals to the gate terminals. Then, the drain terminal outputs the electrical signals that are needed for showing images at the pixels.

The color filter substrate 712b is opposite to the thin film transistor substrate 712a. The color filter substrate is a substrate in which RGB pixels are formed by the thin film process. A common electrode of the ITO is coated on the front surface of the color filter substrate 712b.

If a voltage is applied to the gate terminals and the source terminals of the transistors of the thin film transistor substrate 712a and the thin film transistors are turned on, an electric field is formed between a pixel electrode and the common electrode of the color filter substrate. The arrangement of liquid crystal injected between the thin film transistor substrate 712a and the color filter substrate 714b changes by the electric field, and the transmittance of light changes as the arrangement varies.

A driving signal and a timing signal are applied to the gate line and the data line of the thin film transistor to control the arrangement of the liquid crystal of the liquid crystal panel 712 and the timing of when the liquid crystal is arranged. As shown in the figures, a tape carrier package 716 which is a sort of flexible circuit board for determining the data driving signal application time is attached to the source side of the liquid crystal display panel 712, and a gate side flexible circuit board 718 which is manufactured by the COF method for determining the gate driving signal application time is attached to the gate side.

The integrated printed circuit board 714 for receiving the video signals from the outside of the liquid crystal panel 712 and for applying the driving signals to the gate line and the data line is connected to the tape carrier package 714 of the data line side of the liquid crystal display panel 712. The integrated printed circuit board 714 has a source portion to which the video signals generated in an exterior information processing device (not shown) is applied to provide the data driving signals to the liquid crystal display panel 712 and a gate portion for providing the gate driving signals to the gate line of the liquid crystal display panel 712. The integrated printed circuit board 714 generates the gate driving signals for driving the liquid crystal display device, the data signals, and a plurality of timing signals for applying the gate driving signals and the data signals. The gate driving signals are applied to the gate line of the liquid crystal display panel 712 through the gate side flexible circuit board 718, and the data signals are applied to the data line of the liquid crystal display panel 712 through the data tape carrier package 716.

A back light assembly 720 for providing a uniform light to the display unit 710 is provided under the display unit 710. The back light assembly 720 comprises a linear lamp 722 for generating the light. The linear lamp 722 is provided on one side of the liquid crystal display module 700. A light guide plate 724 has a size corresponding to the liquid crystal panel 712, and is located under the liquid crystal panel 712. The lamp side of the light guide plate 724 is the thickest. The thickness gradually decreases as goes away from the lamp 722. The light guide plate 724 guides the light generated in the lamp 722 towards the display unit 710, and changes the passage of the light.

A plurality of optical sheets 726 for making the luminance of the light which is irradiated from the light guide plate 724 and goes towards the liquid crystal display panel 712 uniform is provided above the light guide plate. A reflection plate 728 provided under the light guide plate 724 reflects the light leaked from the light guide plate and improves the efficiency of the light. The display unit 710 and the back light assembly 720 is supported by a mold frame 730 which is a receiving container. The mold frame 730 has a box-like shape, and the upper portion of the mold frame 730 is open. The mold frame 730 comprises four side walls and a bottom surface, and opening portions for bending the integrated printed circuit board 714 along the outer side surface of the mold frame 730 and positioning the integrated printed circuit board 714 are formed in the bottom surface.

A chassis 740 bends the integrated printed circuit board 714 of the display unit 710 and the gate tape carrier package 718 to the outside of the mold frame 730, and fixes the integrated printed circuit board 714 and the gate tape carrier is package 718 to the bottom surface portion of the mold frame 730. The chassis 740 prevents the deviation of the display unit 710. The chassis 740 has a cubic shape like the mold frame 730, and the upper portion of the chassis 740 is open to expose the liquid crystal display panel 710. The side wall portion of the chassis 740 is vertically bent towards the inner side thereof to cover the peripheral portion of the upper surface of the liquid crystal display panel 710.

A bottom chassis 750 is provided in the mold frame 730 to positively fix the back light assembly 720 at a designated position. The bottom chassis 750 has a recessed portion at the central portion thereof to press the bottom surface of the back light assembly and fix the back light assembly 720. Therefore, the area of the liquid crystal display device is increased by the existence of the bottom chassis 750, and the number of the assembling processes for bottom chassis 750 increases. Thus, the manufacturing cost of the liquid crystal display device 100 also increases.

The display unit 710 and the back light assembly 720 is received in the mold frame 730, and the mold frame 730 is thin so as to reduce the size of the liquid crystal display device, and has four side surfaces and one bottom surface. When the mold frame 730 is manufactured using a die, variations in the side surfaces and the bottom surface of the mold frame distort the mold frame 730, which costs lots of trial and errors and manufacturing time.

Further, if a portion of the mold frame 730 is changed, the overall shape of the mold frame 30 should be restructured and the improvement of the mold frame 730 is difficult to improve. Furthermore, recently, since the liquid crystal display device becomes light and thin and as the mold frame of the lamp side becomes thinner, the mold frame cannot be molded easily and the distortion of the mold frame causes serious problems.

SUMMARY OF THE INVENTION

Therefore, it is an object of the present invention to provide a liquid crystal display device having receptacles that can simplify the assembling process by reducing the number of parts and that can be easily molded and prevent the distortion.

In order to achieve the above-mentioned object of the present invention, the present invention provides a liquid crystal display device that comprises a back light assembly having a light source section for generating a light and a luminance improving section for guiding the light, and a receiving module formed of at least one material, for receiving the back light assembly by engaging at least two receiving members. The receiving module comprises a first receptacle module formed of a metal, and a second receptacle module engaged with both ends of the first receptacle module so as to be opposite to each other to provide a receiving space in which the back light assembly is received and formed of a plastic material. The first material is a metal and the second material is a plastic material. The first receptacle module is formed of at least one plate and an engaging hole is formed in the first receptacle module. The second receptacle module comprises a first and a second mold frame respectively having a side wall and a bottom surface which is perpendicular to the side wall and is extended towards the receiving space to support the back light assembly and an engaging recess is formed at a position corresponding to the engaging hole of the first receptacle module of the first and second mold frames. The receiving module further comprises an engaging screw for engaging the first and second receptacle modules by penetrating the engaging hole of the second receptacle module and engaging with the engaging recess of the first receptacle module.

BRIEF DESCRIPTION OF THE DRAWINGS

The above and other objects and advantages of the present invention will become readily apparent by reference to the following detailed description when considered in conjunction with the accompanying drawings wherein.

DETAILED DESCRIPTION OF THE PREFERRED EMBODIMENT

Hereinafter, preferred embodiments of the present invention will be explained in detail with reference to the attached drawings.

Figure 1:
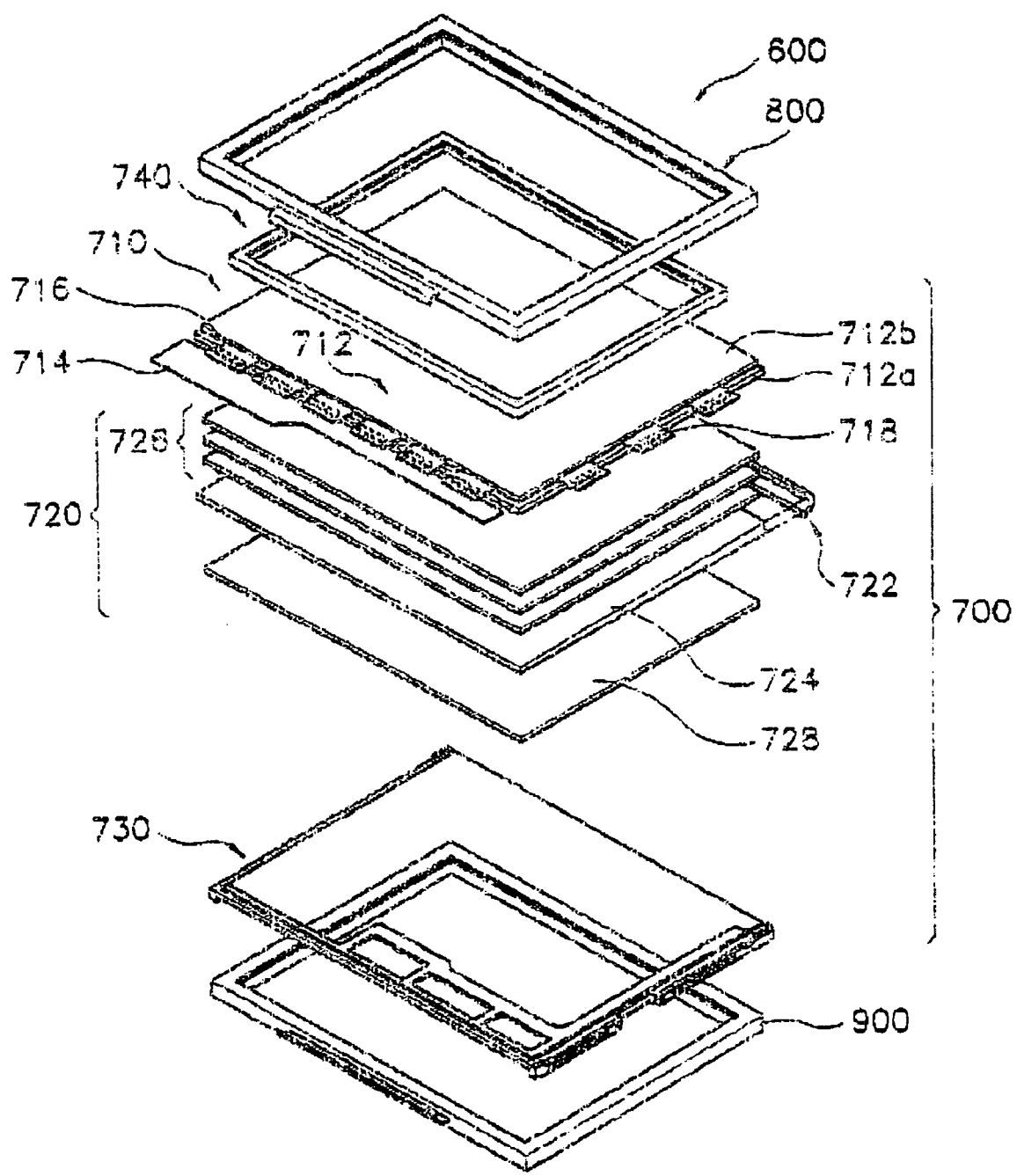
FIG. 1 is an exploded perspective view for schematically showing a conventional liquid crystal display device.
Figure 2:
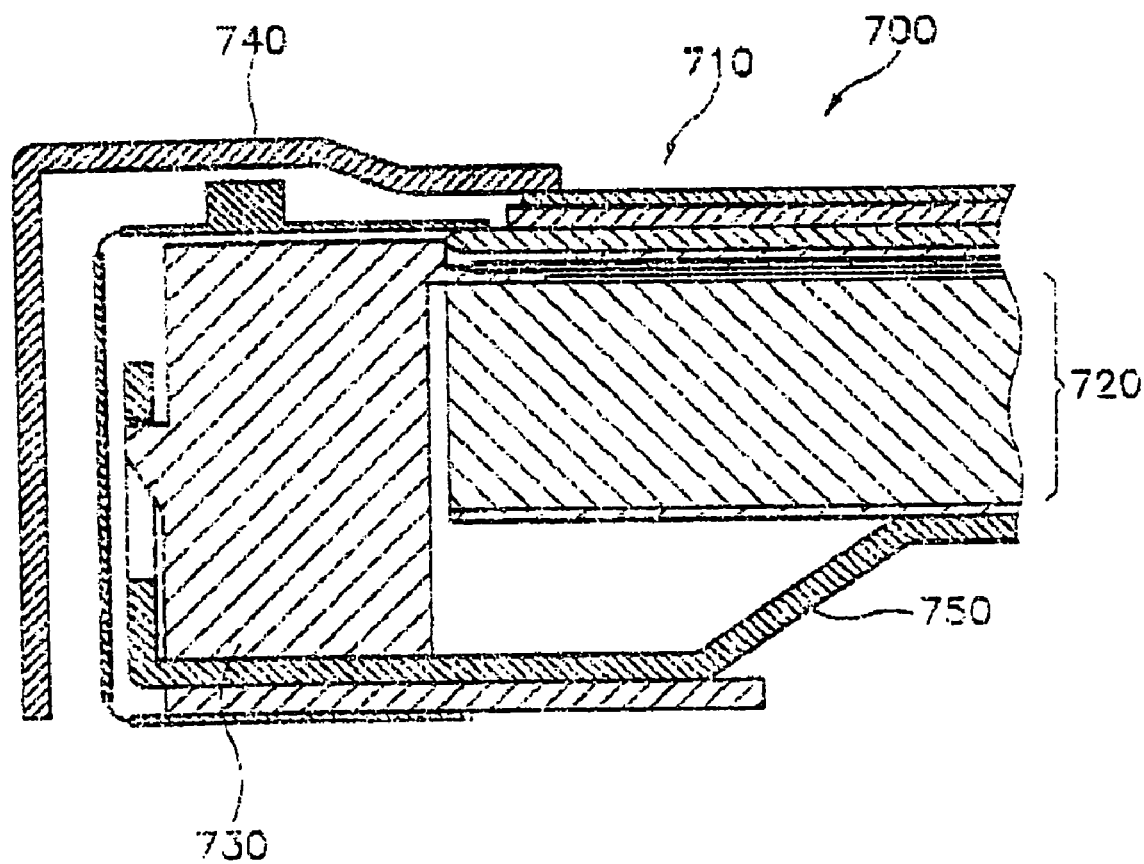
FIG. 2 is a cross-sectional view for showing the assembled state of the liquid crystal display device of FIG. 1.
Figure 3:
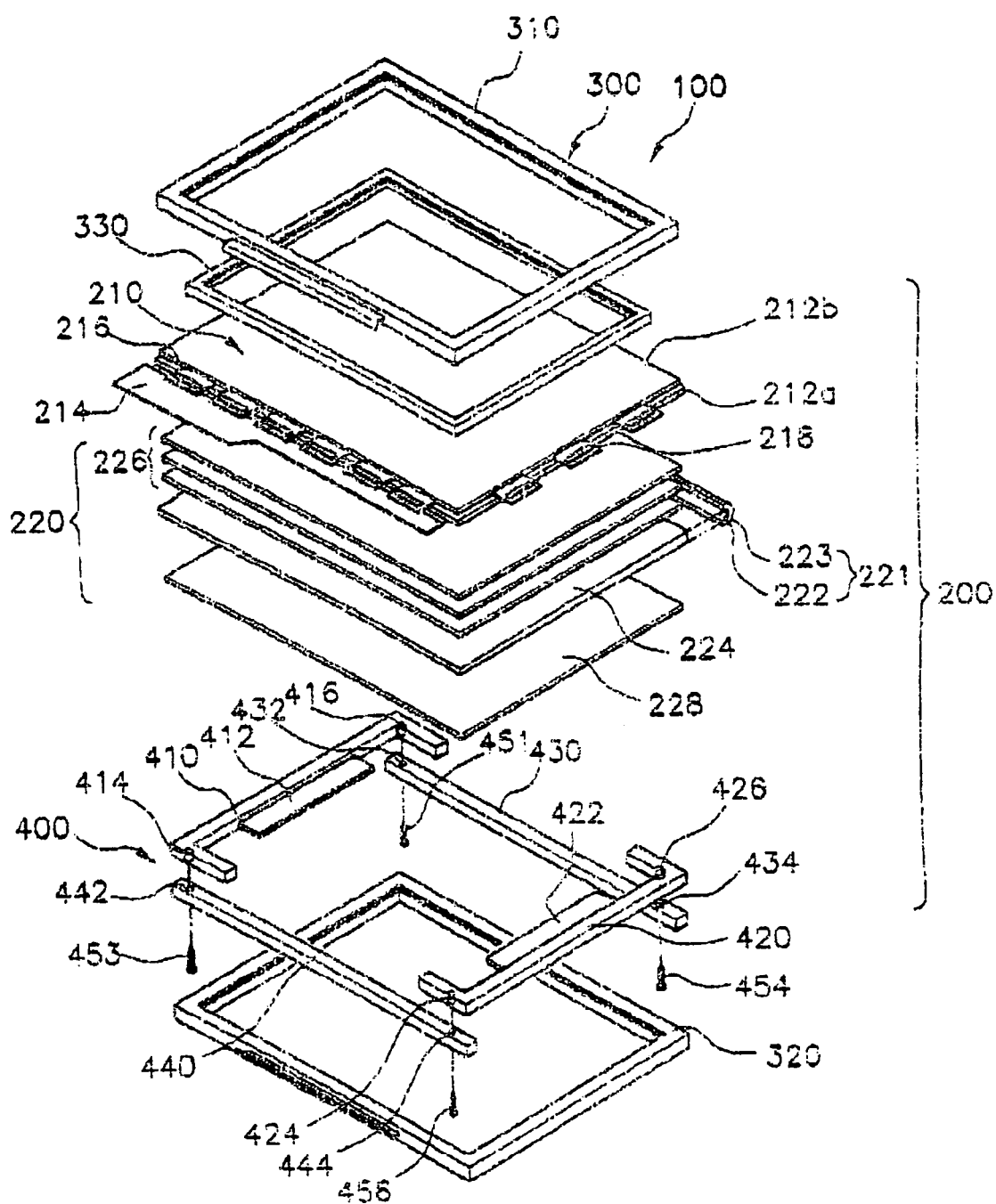
FIG. 3 is an exploded perspective view for showing a liquid crystal display device according to a preferred embodiment of the present invention.

FIG. 3 is an exploded perspective view for schematically showing a liquid crystal display device according to a preferred embodiment of the present invention.

Referring to FIG. 3, a liquid crystal display device 100 comprises a liquid crystal display module 200 to which video signals are applied to represent a screen and a case having a front surface case 310 and a rear surface case 320 for receiving the liquid crystal display module 200.

The liquid crystal display module 200 comprises a display unit 210 including a liquid crystal display panel which represents a screen.

The display unit 210 comprises a liquid crystal display panel 212, an integrated printed circuit board 214, a data side tape carrier package 216, and a gate side flexible circuit board 218 that is manufactured by the COF method.

The liquid crystal display panel 212 comprises a thin film transistor substrate 212a, a color filter substrate 212b, and a liquid crystal layer therebetween (not shown).

The thin film transistor substrate 212a is a transparent glass substrate in which thin film transistors of the matrix type are formed. A data line is connected to source terminals of the thin film transistors, and a gate line is connected to gate terminals. A pixel electrode of indium tin oxide (ITO), which is a transparent conductive material, is formed in the drain terminal.

If electrical signals are inputted to the data line and the gate line, the electrical signals are inputted to the source terminals and the gate terminals of the thin film transistors, and the thin film transistors are turned on or off by the inputting of the electrical signals, and the electrical signals which are needed for forming pixels are outputted to the drain terminal.

The color filter substrate 212b is opposite to the thin film transistor substrate 212a. The color filter substrate is a substrate in which RGB pixels are formed by the thin film process. A common electrode of the ITO is coated on the front surface of the color filter substrate 212b.

If a power source is applied to the gate terminals and the source terminals of the transistors of the thin film transistor substrate 212a and the thin film transistors are turned on, an electric field is formed between a pixel electrode and the common electrode of the color filter substrate. The arrangement of a liquid crystal injected between the thin film transistor substrate 212a and the color filter substrate 214b is changed by the electric field, and the optical transmitting degree changes as the arrangement of liquid crystals changes to obtain a pixel image.

A driving signal and a timing signal are applied to the gate line and the data line of the thin film transistor to control the arrangement of the liquid crystal of the liquid crystal panel 212 and the timing of the liquid crystal arrangement. As shown in the figures, a tape carrier package 216 that is a sort of flexible circuit board for determining the applying time of the data driving signal is attached to the source side of the liquid crystal display panel 712, and a gate side flexible circuit board 218 manufactured by the COF method for determining the applying time of the driving signal of the gate is attached to the gate side.

The integrated printed circuit board 214 for receiving the video signals from the outside of the liquid crystal panel 212 and applying the driving signals to the gate line and the data line is connected to the tape carrier package 214 of the data line side of the liquid crystal display panel 212. The integrated printed circuit board 214 has a source portion to which the video signals generated in an exterior information processing device (not shown) is applied to provide the data driving signals to the liquid crystal display panel 212 and a gate portion for providing the gate driving signals to the gate line of the liquid crystal display panel 212.

The integrated printed circuit board 214 generates the gate driving signals for driving the liquid crystal display device, the data signals, and a plurality of timing signals for applying the gate driving signals and the data signals. The gate driving signals are applied to the gate line of the liquid crystal display panel 212 through the gate side flexible circuit board 218, and the data signals are applied to the data line of the liquid crystal display panel 212 through the data tape carrier package 216.

A back light assembly 220 for providing a uniform light to the display unit 210 is provided under the display unit 210. The back light assembly 220 comprises a linear lamp 222 for generating the light. The linear lamp 222 is protected by a lamp cover 223. The linear lamp 222 is provided on one side of the liquid crystal display module 200. A light guide plate 224 has a size which corresponding to the liquid crystal panel 212, and is located under the liquid crystal panel 212. The lamp side of the light guide plate 224 is the thickest, and is thinner at the other end. The light guide plate 224 guide the light generated in the lamp 222 towards the display unit 210, and changes the light transmittance.

A plurality of optical sheets 226 for making the uniform luminance of the light irradiated from the light guide plate 224 and goes towards the liquid crystal display panel 212 is provided above the light guide plate. A reflection plate 228 for reflecting the light leaking from the light guide plate and improving the efficiency of the light is provided under the light guide plate 224.

The display unit 210 and the back light assembly 220 is supported by a mold frame 230 which is a receptacle assembly.

The mold frame 400 can be variously constituted as shown in FIGS. 4 to 14. Hereinafter, five receptacle assemblies are explained as preferred embodiments of the present invention.

Figure 4A:
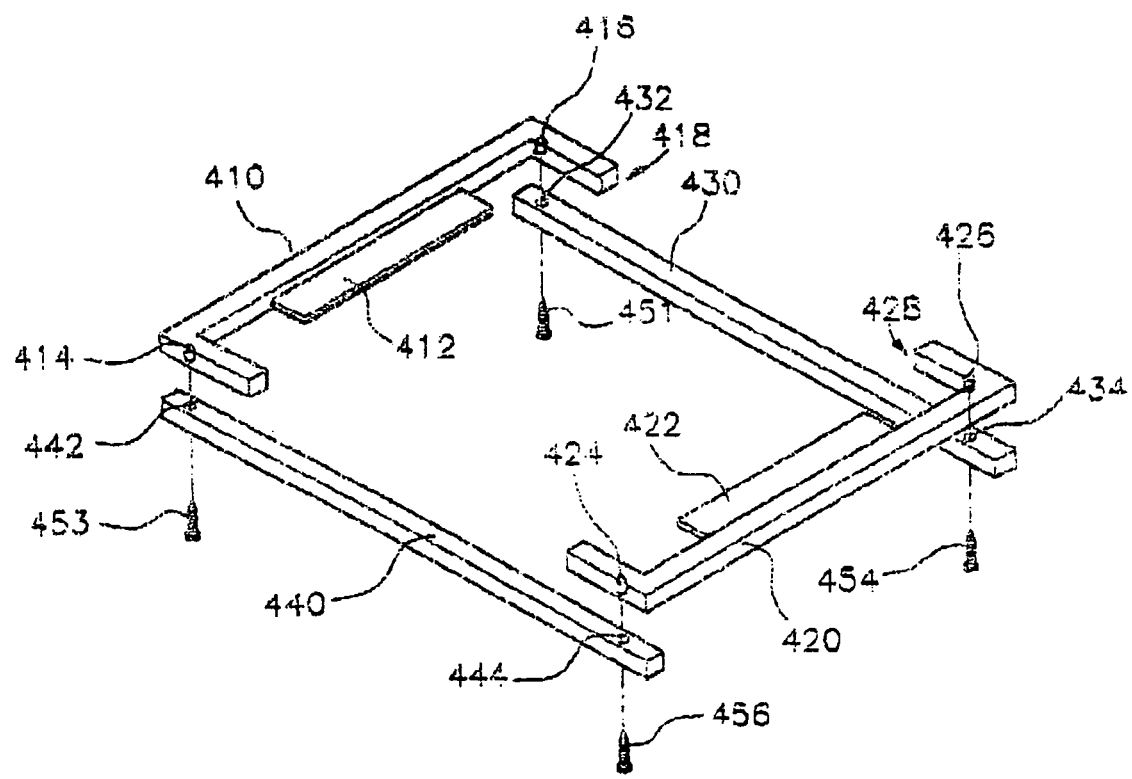
FIGS. 4A and 4B are an exploded perspective view and a cross-sectional view for showing a receptacle assembly according to the first preferred embodiment of the present invention.
Figure 4B:
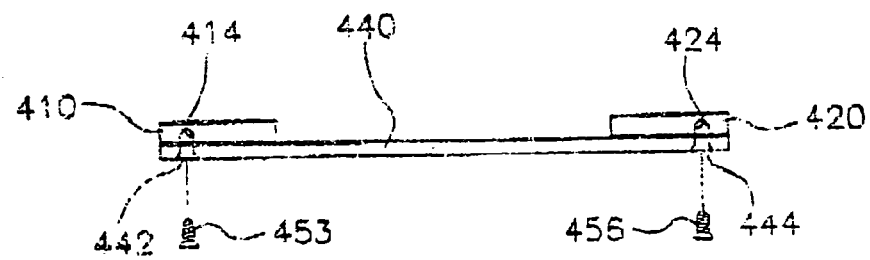

Referring to FIGS. 4A and 4B, a mold frame 400 according to a first preferred embodiment of the present invention comprises four unit receptacles. Two unit receptacles which have a same shape and are opposite to each other are defined as first receptacle modules 430 and 440, and the other two unit receptacles which are opposite to both end portions of the first receptacle module 430 and 440 and constitutes a side wall are defined as second receptacle modules 410 and 420.

The first receptacle modules 430 and 440 have a rectangular shape that has a thin thickness and a width, and are molded by using a metal. First and second engaging holes 432 and 434 are formed at both ends of the lengthwise direction of a first receptacle 430 of the first receptacle module 430 and 440, and third and fourth engaging holes 442 and 444 are formed at both ends of the lengthwise direction of a second receptacle 440 of the first receptacle modules 430 and 440.

The second receptacle modules 410 and 420 comprises third and fourth receptacles 410 and 420 which are opposite to each other and are engaged with both ends of the first receptacle modules 430 and 440. The third and fourth receptacles 410 and 420 are formed such that side walls of which have a bar shape having a square cross-section covering the upper portions of the both ends of the first receptacle modules 430 and 440 in which the first and second engaging holes 432 and 434 and the third and fourth engaging holes 442 and 444 are formed. The third and fourth receptacles 410 and 420 are extended such that they surround upper portions adjacent to the first to fourth engaging holes 432, 434, 442, and 444. Bottom plates 462 and 472 are extended from both side walls of the third and fourth receptacles 410 and 420 which are opposite to each other towards the inner sides thereof. The bottom plate 442 supports the back light assembly 220 and the display unit 210 which are sequentially received in a receiving space provided by engaging the first and second receptacle modules. The bottom surface of the middle portion of the receiving space provided by the first and second receptacle modules has an open shape to position the integrated printed circuit board 214.

Bending portions of the third and fourth receptacles 410 and 420 extended from both ends of the third and fourth receptacles 410 and 420 such that they cover the upper surfaces of the first and second receptacles 430 and 440 have groove shapes 418 and 428 in which the inner side walls thereof are smooth. The lamp unit 221 is positively supported by the groove shapes when the back light assembly 220 is received. The third and fourth receptacles 410 and 420 are engaged with the both end portions of the first receptacle modules 430 to provide the receiving space in which the display unit 210 and the back light assembly 220 is received. The third and fourth receptacles 460 and 470 are molded of plastic materials.

First to fourth engaging recesses 416, 426, 414, and 424 are formed at positions corresponding to the first to fourth engaging holes 432, 434, 442, and 444 on the rear surfaces of the bending portions which is bent so as to cover the upper surfaces of the first and second receptacles 430 and 440 at both ends of the third and fourth receptacle 410 and 420. The third and fourth receptacles 410 and 420 are engaged with the first and second receptacles 430 and 440, as shown in FIG. 4B, by first to fourth engaging screws 451, 454, 453, and 456 penetrate the first to fourth engaging holes 432, 434, 442, and 444 and proceed towards the first to fourth engaging recesses 416, 426, 414, and 424.

The process in which the display unit 210 and the back light assembly 220 are inserted into the receptacle assembly 400 will be explained later. Hereinafter, another preferred embodiment of the receptacle assembly 400 will be explained.

Figure 5A:
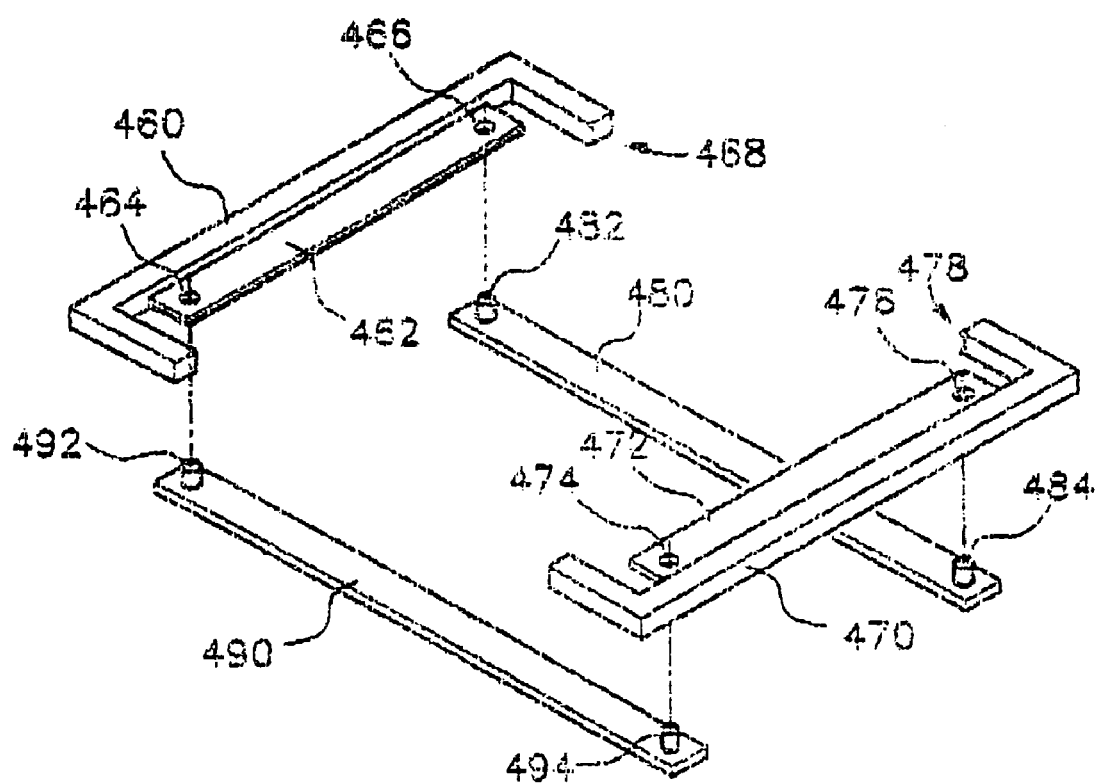
FIGS. 5A and 5B are exploded perspective views of portions of a receptacle assembly according to the second preferred embodiment of the present invention.
Figure 5B:
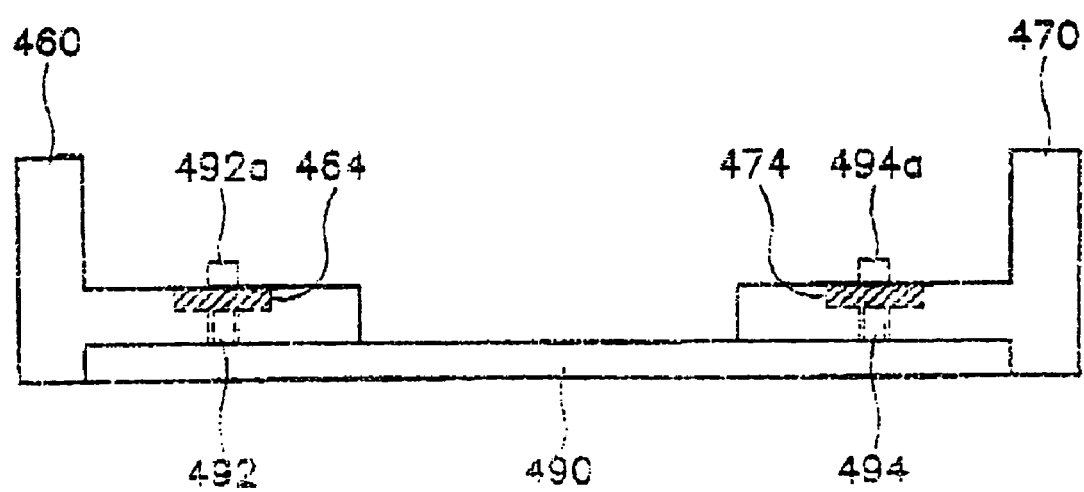

FIGS. 5A and 5B are exploded perspective views for showing a portion of the receptacle assembly according to the second preferred embodiment of the present invention.

Referring to FIGS. 5A and 5B, the receptacle assembly according to the second preferred embodiment of the present invention comprises a first receptacle module having first and second receptacles 480 and 490 and a second receptacle module having third and fourth receptacles 460 and 470, as in the first preferred embodiment.

The first and second receptacles 480 and 490 have rectangular shapes having a thin thickness and a width, and are molded of a metal. First and fourth engaging bosses 482, 484, 492, and 494 are protruded from the upper surfaces of both ends of the lengthwise directions of the first and second receptacles 480 and 490. The engaging bosses protruded from the end portions of the first and second receptacles 480 and 490 can be formed in several numbers, respectively.

The second receptacle module comprises the third and fourth receptacles 460 and 470 engaged with both ends of the first and second receptacles 480 and 490 and are opposite to each other.

The third and fourth receptacles 460 and 470 are formed such that side walls which have bar shapes having square cross-sections cover both ends of the first and second receptacles 480 and 490 and the upper portions adjacent to the both ends. The bending portions of the third and fourth receptacles 460 and 470 extended so as to cover the upper portions of the both ends of the first and second receptacles 480 and 490 have groove shapes 468 and 478. The inner side walls of the groove shapes 468 and 478 are smooth. The lamp unit 221 is positively supported by the bending portions when the back light assembly 220 is received. The third and fourth receptacles 460 and 470 are engaged with both ends of the first and second receptacles 480 and 490 to provide a receiving space in which the display unit 210 and the back light assembly 220 are received.

Bottom plates 462 and 472 are extended from the side walls of the third and fourth receptacles 460 and 470 towards the receiving space. First to fourth engaging holes 466, 476, 464, and 474 are formed in the bottom plates 462 and 472 of the third and fourth receptacles 460 and 470 at positions corresponding to the first to fourth engaging bosses 482, 484, 492, and 494. The third and fourth receptacles 460 and 470 are engaged with the upper surfaces of both ends of the first and second receptacles 480 and 490 by the engagement of the first to fourth engaging holes 466, 476, 464, and 474 and the first to fourth engaging bosses 482, 484, 492, and 494 to provide the receiving space in which the display unit 210 and the back light assembly 220 are received. The third and fourth receptacles 460 and 470 are molded of plastic materials.

The first to fourth engaging bosses 482, 484, 492, and 494 functions as rivets, and the engaging shapes of the first to fourth engaging holes 466, 476, 464, and 474 and the first to fourth engaging bosses 482, 484, 492, and 494 are as shown in FIG. 5B which shows a cross-sectional view of the receptacle assembly shown in FIG. 5A.

Referring to FIG. 5B, the third and fourth engaging bosses 492 and 494 of the second receptacle 490 are inserted into the third and fourth engaging holes 464 and 474 of the third and fourth receptacles 460 and 470.

Then, if the portions 492a and 494a of the third and fourth engaging bosses 492 and 494 which protruded on the upper surfaces of the bottom plates 462 and 472 are pressed, the protruding portions 492a and 494a of the third and fourth engaging bosses 492 and 494 fills the upper portions which are formed such that they are wider than the lower portions of the third and fourth engaging holes 464 and 474 as the slanted lines of FIG. 5B. The first and second receptacles 480 and 490 and the third and fourth receptacles 460 and 470 which are engaged by the riveting of the first and fourth engaging holes 466, 476, 464, and 474 and the first to fourth engaging bosses 482, 484, 492, and 494 receives and supports the display unit 210 and the back light assembly 220.

Figure 6A:
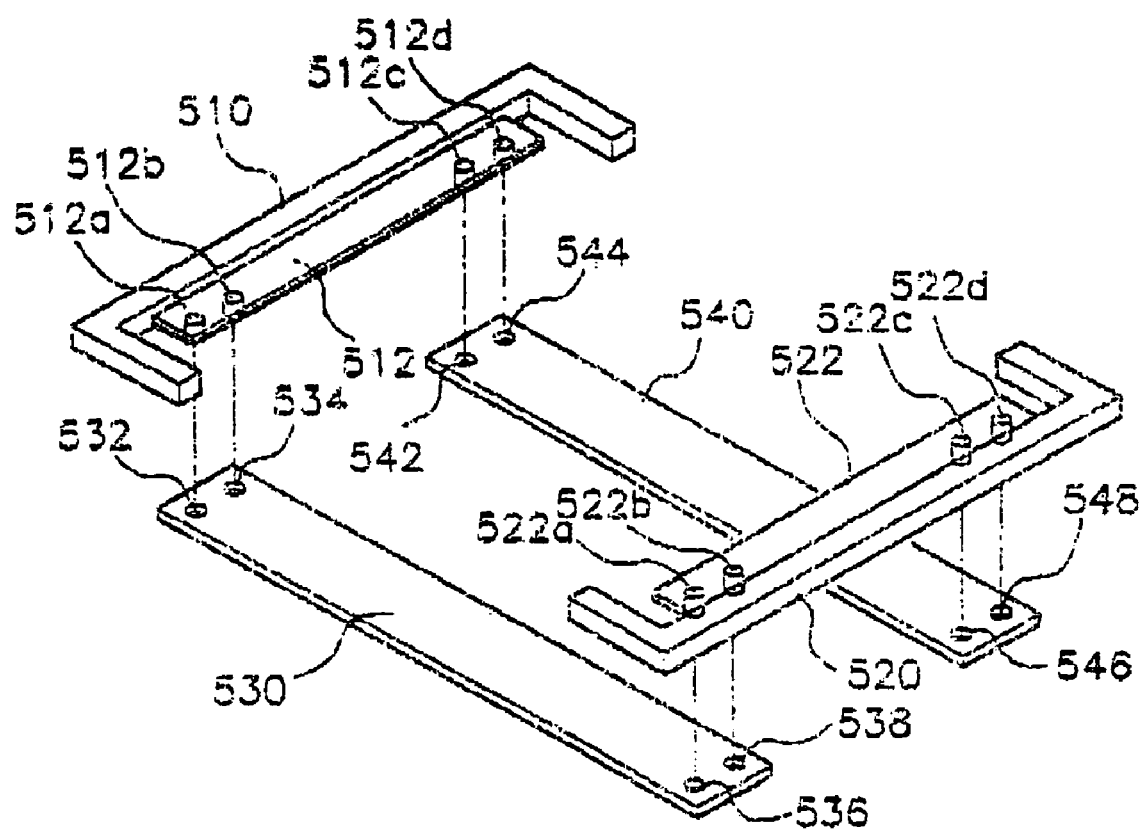
FIGS. 6A and 6B are exploded perspective view and an engaging perspective view for showing a receptacle assembly according to the third preferred embodiment of the present invention.
Figure 6B:
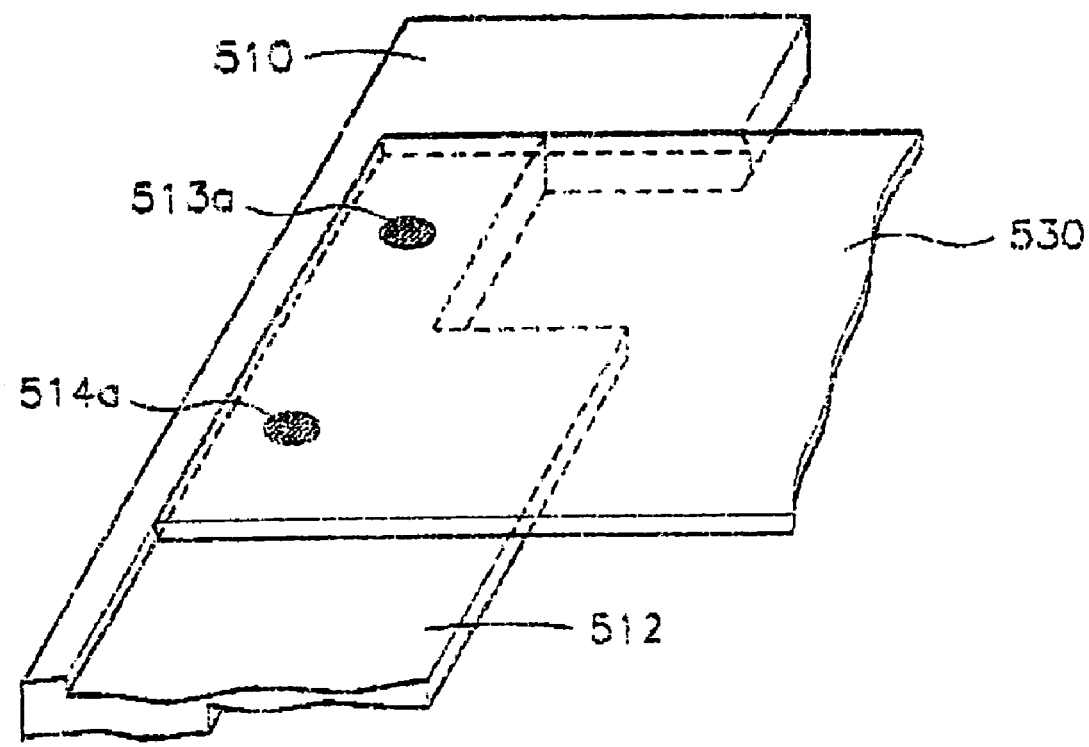

FIGS. 6A and 6B are exploded and engaging perspective view for showing a portion of a receptacle assembly according to the third preferred embodiment of the present invention.

Referring to FIGS. 6A and 6B, the receptacle assembly according to the third preferred embodiment of the present invention comprises a first receptacle module having first and second receptacles 530 and 540 and a second receptacle module having third and fourth receptacles 510 and 520.

The first and second receptacles 530 and 540 have rectangular shapes which have a thin thickness and a width, and are molded of a metal. First to fourth engaging holes 532, 534, 536, and 538 are formed in both end portions of the lengthwise direction of the first receptacle 530. Fifth to eighth engaging holes 542, 544, 546, and 548 are formed in both ends of the second receptacles 540.

The third and fourth receptacles 510 and 520 are engaged with the upper surfaces of both ends of the first and second receptacles 530 and 540 to provide a receiving space. The third and fourth receptacles 510 and 520 have a clamp is shape, and bottom plates 512 and 522 are extended from the side walls of the third and fourth receptacles 510 and 520 towards the receiving space. First to eighth engaging bosses 512a, 512b, 522a, 522b, 512c, 512d, 522c, and 522d are formed on the rear surfaces of the bottom plates 512 and 522 of the third and fourth receptacles 510 and 520 at positions corresponding to the first and eighth engaging holes 532, 534, 536, 538, 542, 544, 546, and 548. The first to eighth engaging bosses 512a, 512b, 522a, 522b, 512c, 512d, 522c, and 522d are formed of the same material as the third and fourth receptacles 510 and 520. The third and fourth receptacles 510 and 520 are molded of plastic materials. The third and fourth receptacles 510 and 520 are engaged with the upper surfaces of the both end portions of the first and second receptacles 530 and 540 by engaging the first to eighth engaging holes 532, 534, 536, 538, 542, 544, 546, and 548 with the first to eighth engaging bosses 512a, 512b, 522a, 522b, 512c, 512d, 522c, and 522d, and thus provides the receiving space for receiving the display unit 210 and the back light assembly 220.

The shapes of the first to eighth engaging holes 532, 534, 536, 538, 542, 544, 546, and 548 and the first to eighth engaging bosses 512a, 512b, 522a, 522b, 512c, 512d, 522c, and 522d are as shown in FIG. 6B.

Referring to FIG. 6B, the first and second engaging bosses 512a and 512b of the third receptacle 510 are inserted into the first and second engaging holes 532 and 534 of the first receptacle 530. The third to eighth engaging bosses 522a, 522b, 512c, 512d, 522c, and 522d are engaged with the third to eighth engaging holes 536, 538, 542, 544, 546, and 548 in the same manner.

Then, if the portions of the first and second engaging bosses 512a and 512b which are penetrated through the first and second engaging holes 532 and 534 and are protruded from the rear surface of the first receptacle 530 are heated, the protruded portions of the first and second engaging bosses 512a and 512b are fused to the rear surface of the first receptacle 530 like the slanted portions 513a and 514b of FIG. 6B. The engagements of the engaging holes and the engaging bosses by the heat fusion are applied to the third to eighth engaging bosses 522a, 522b, 512c, 512d, 522c, 522d and the third to eighth engaging holes 536, 538, 542, 544, 546, and 548 to provide the receiving space for receiving the display unit 210 and the back light assembly 220.

Figure 7:
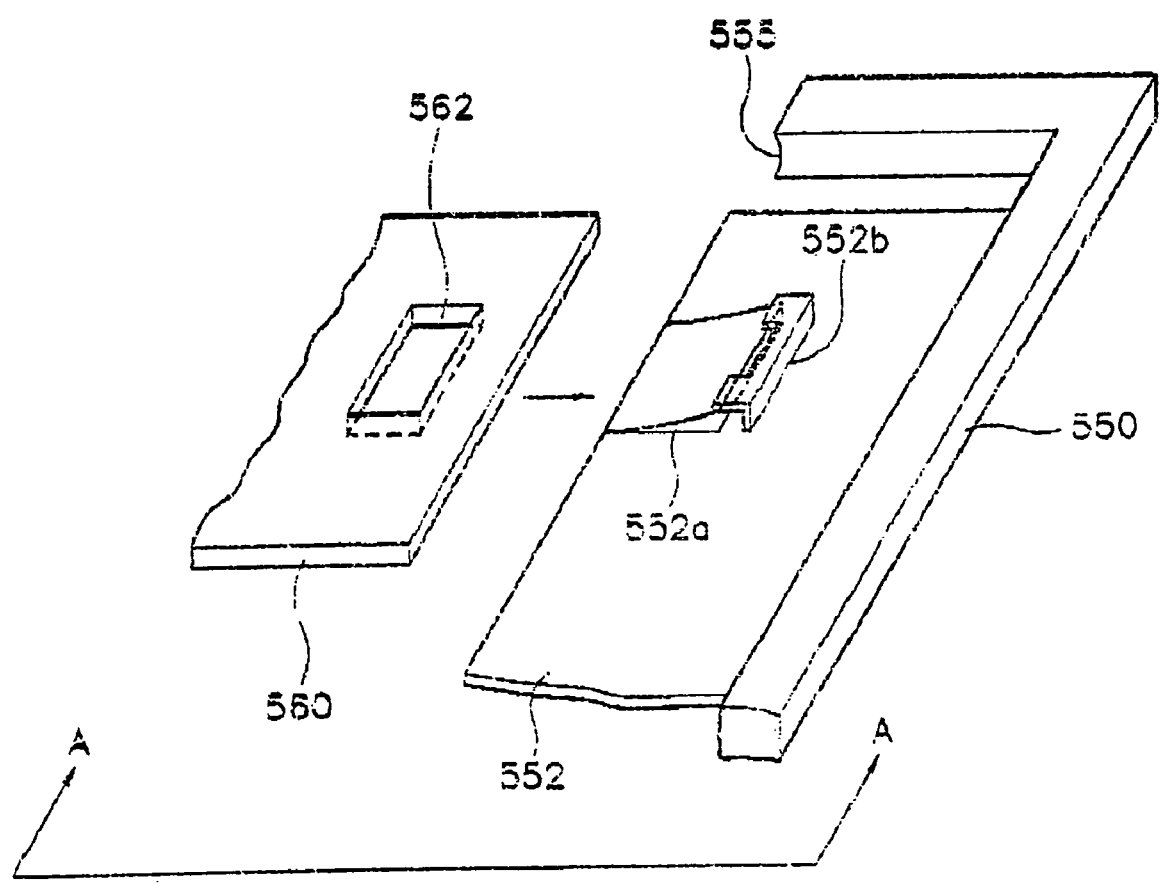
FIG. 7 is a exploded perspective view for showing a portion of a receptacle assembly according to the fourth preferred embodiment of the present invention.
Figure 8A:
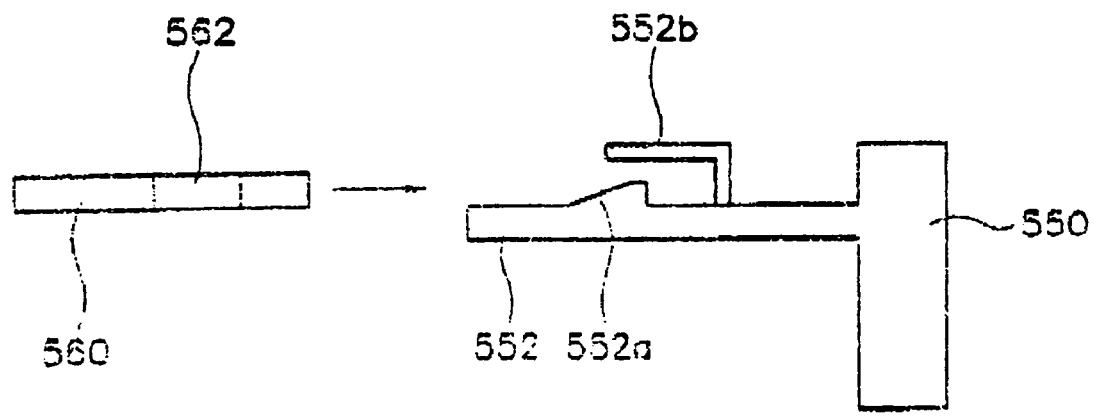
FIGS. 8A and 8B are cross-sectional views for showing the receptacle assembly of FIG. 7.
Figure 8B:
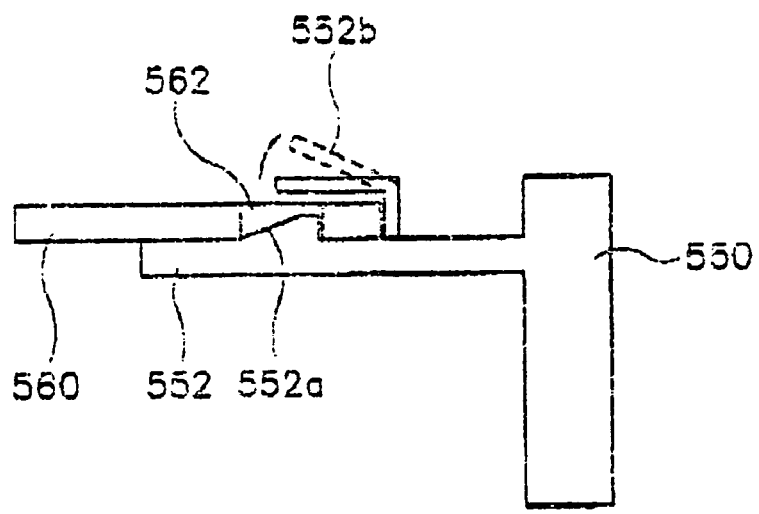

FIG. 7 is a perspective view for showing a portion of a receptacle assembly according to the fourth preferred embodiment of the present invention, and FIGS. 8A and 8B are cross-sectional views for showing the engaged state of the receptacle assembly of FIG. 7.

Referring to FIG. 7, a mold frame 400 according to the fourth preferred embodiment of the present invention comprises a first receptacle module having first and second receptacles and a second receptacle module having third and fourth receptacles like the other preferred embodiments of the present invention. Therefore, in the fourth preferred embodiment of the present invention, only portions of the first receptacle 560 of the first receptacle module and the third receptacle 550 of the second receptacle module are explained.

Like the third preferred embodiment of the present invention, rectangular catching recesses 562 are formed at both ends of the first receptacle 560 molded of a metal, and catching jaws 552a for preventing the horizontal deviation of the first receptacle 560 by engaging with the catching recesses 562 of the first receptacle 560 are formed on the rear surface of the bottom plate 552 of the third receptacle 550. And, a deviation preventing cap 552b that surrounds the side portion and the upper portion of the catching jaw 552a to prevent the vertical deviation off the first receptacle 560 are formed.

On the other hand, the inner side wall of the third receptacle 550 has a smooth groove shape 555. The ends of the first receptacle 560 and the second receptacle (not shown) of the first receptacle module are engaged with the rear surface of the bottom plate of the third receptacle 550 and the fourth receptacle (not shown) of the second receptacle module to provide a receiving space for receiving the back light assembly 220 and the display unit 210.

The engaging process of the catching recesses 560 and the catching jaws are shown in FIGS. 8A and 8B.

As shown in FIG. 8A, if the first receptacle 560 proceeds in a direction parallel to the bottom plate 552 of the second receptacle 550, the first receptacle 560 slides the inclined surface of the catching jaw 552a towards the side wall of the third receptacle 550. Then, since the deviation preventing cap 552b covering the upper surface of the catching jaw 552a has a resilient force, it moves upwardly from the bottom plate 552 as shown in FIG. 8B. If the catching recess 562 is engaged with the catching jaw 552a by the proceeding of the first receptacle, the deviation preventing cap 552b is restored to the original position to prevent the vertical deviation of the first receptacle 560.

The engaging process of the first receptacle 560 and the third receptacle 550 is applied to other portions of the first and second receptacle modules to provide a receiving space for receiving the display unit 210 and the back light assembly 220.

Figure 9:
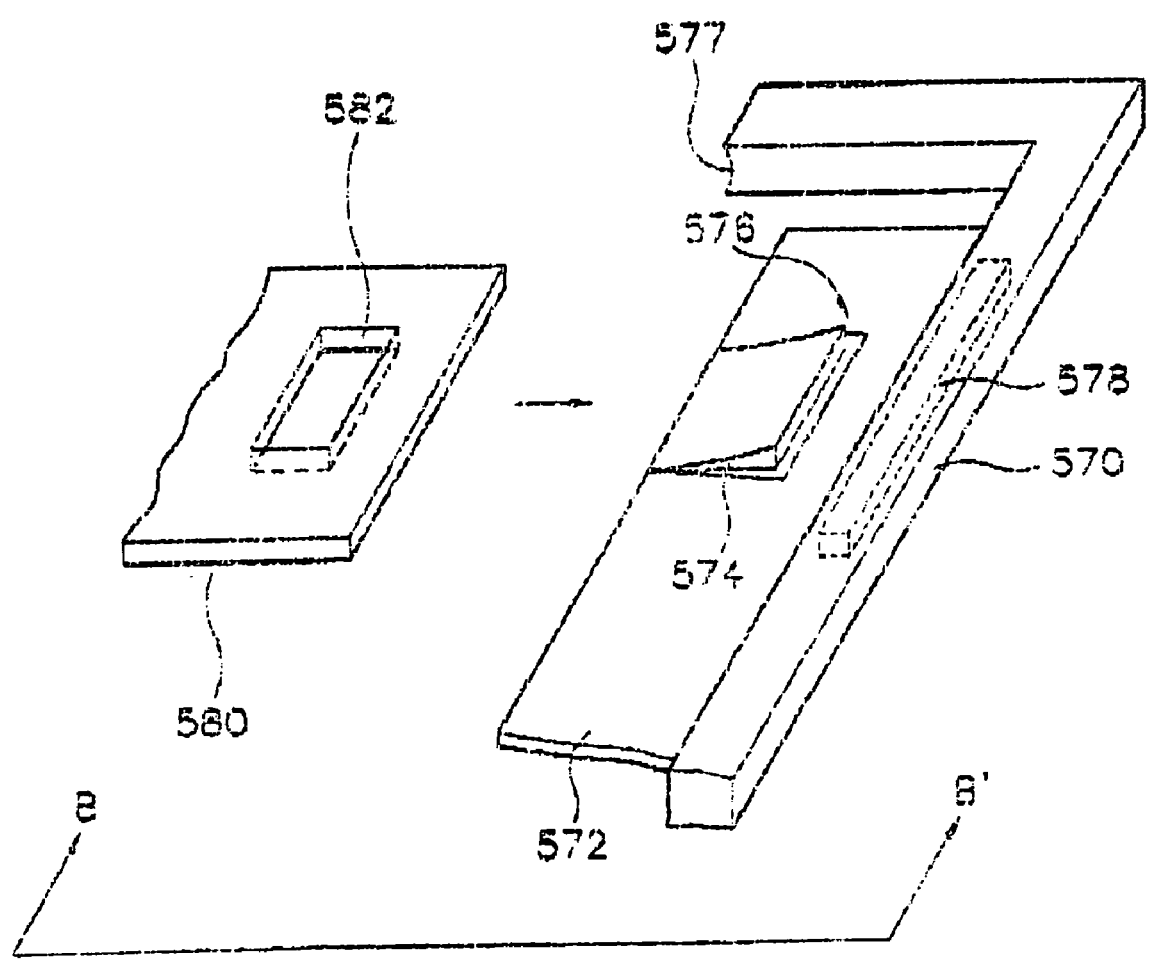
FIG. 9 is an exploded perspective view for showing a portion of a receptacle assembly according to the fifth preferred embodiment of the present invention.
Figure 10A:
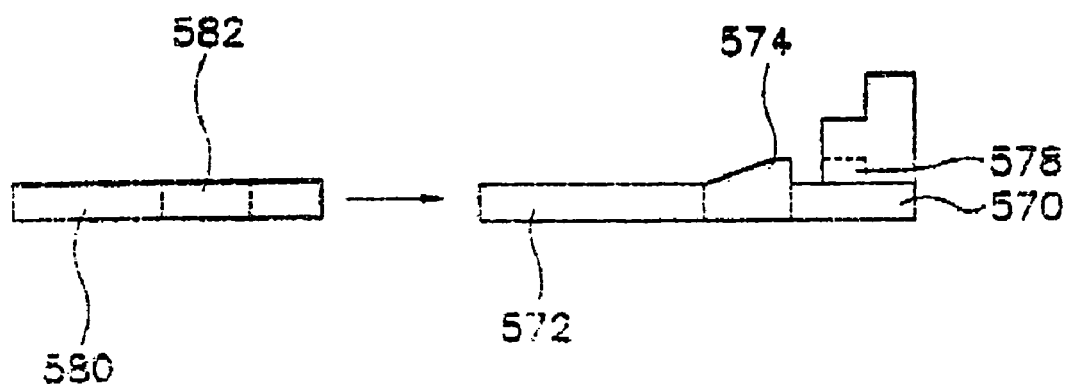
FIGS. 10A and 10B are cross-sectional views for showing the receptacle assembly of FIG. 9.
Figure 10B:
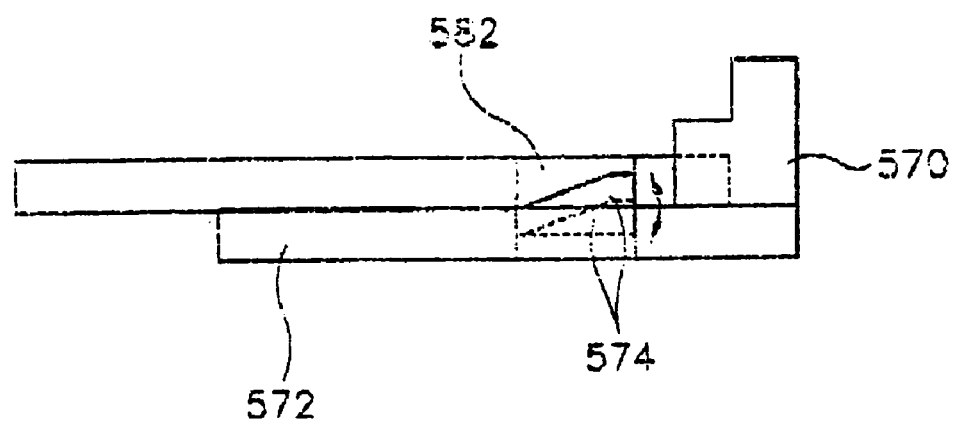

FIG. 9 is a perspective view for showing a portion of a receptacle assembly according to the fifth preferred embodiment of the present invention, and FIGS. 10A and 10B are views for showing the engaged state of the receptacle assembly of FIG. 9.

Referring to FIG. 9, a mold frame 400 according to the fifth preferred embodiment of the present invention comprises a first receptacle module having first and second receptacles and a second receptacle module having third and fourth receptacles like the other preferred embodiments of the present invention. Therefore, in the fifth preferred embodiment of the present invention, only portions of the first receptacle 580 of the first receptacle module and the third receptacle 570 of the second receptacle module are explained.

In the fifth preferred embodiment of the present invention, rectangular catching recesses 582 which are penetrated through the first receptacle 580 are formed at both ends of the first receptacle 580 molded of a metal, and catching jaws 574 for preventing the horizontal deviation of the first receptacle 580 by engaging with the catching recesses 582 of the first receptacle 580 are formed on the rear surface of the bottom plate 572 of the third receptacle 570. The catching jaw 574 is formed as a portion of the bottom plate 572, and has a resilient force. The bottom plate under the catching jaw 574 has a cut-off shape.

On the other hand, the inner side wall of the third receptacle 570 has a smooth groove shape 577. A receiving recess 578 in which an end of the first receptacle 580 is received is formed on the inner side wall of the third receptacle 570. The ends of the first receptacle 580 and the second receptacle (not shown) of the first receptacle module are engaged with the bottom plate of the third receptacle 570 and the fourth receptacle (not shown) of the second receptacle module to provide a receiving space for receiving the back light assembly 220 and the display unit 210.

The engaging process of the catching recesses 560, the catching jaws 574, and the receiving recess 578 are shown in FIGS. 10A and 10B.

As shown in FIG. 10A, if the first receptacle 580 proceeds in a direction parallel to the bottom plate 572 of the second receptacle 570, the catching jaw 574 having the resilient force is moved towards the bottom plate 572 as shown in FIG. 10B. Then, if the end of the first receptacle 580 is pushed to be received in the receiving recess 578 formed on the side wall of the third receptacle 570, the catching jaw 574 is restored to the original position by using the resilient force thereof, and is moved into the catching recess 582 of the first receptacle 580. The catching jaw 574 prevents the horizontal deviation of the first receptacle 580, and the receiving recess 578 of the third receptacle 570 prevent the vertical deviation of the first receptacle 580.

The engaging manners of the first receptacle 580 and the third receptacle 570 are applied to other portions of the first and second receptacle modules to provide a receiving space for receiving the display unit 210 and the back light assembly 220.

Figure 11:
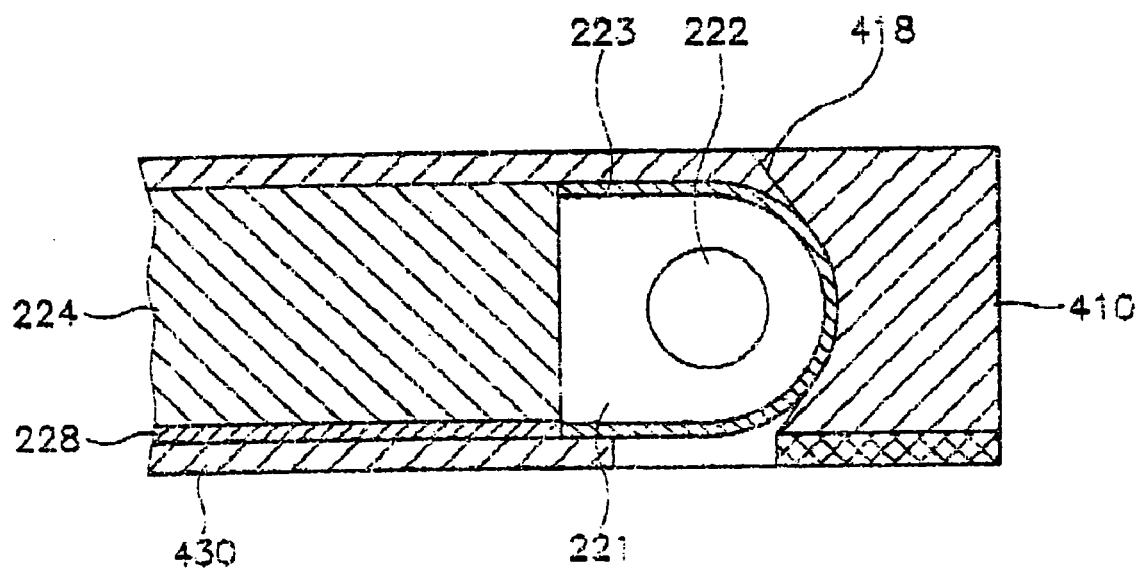
FIGS. 11 and 12 are cross-sectional views for explaining the receiving of a lamp unit and a display unit in the receptacle assembly according to the first preferred embodiment.
Figure 12:
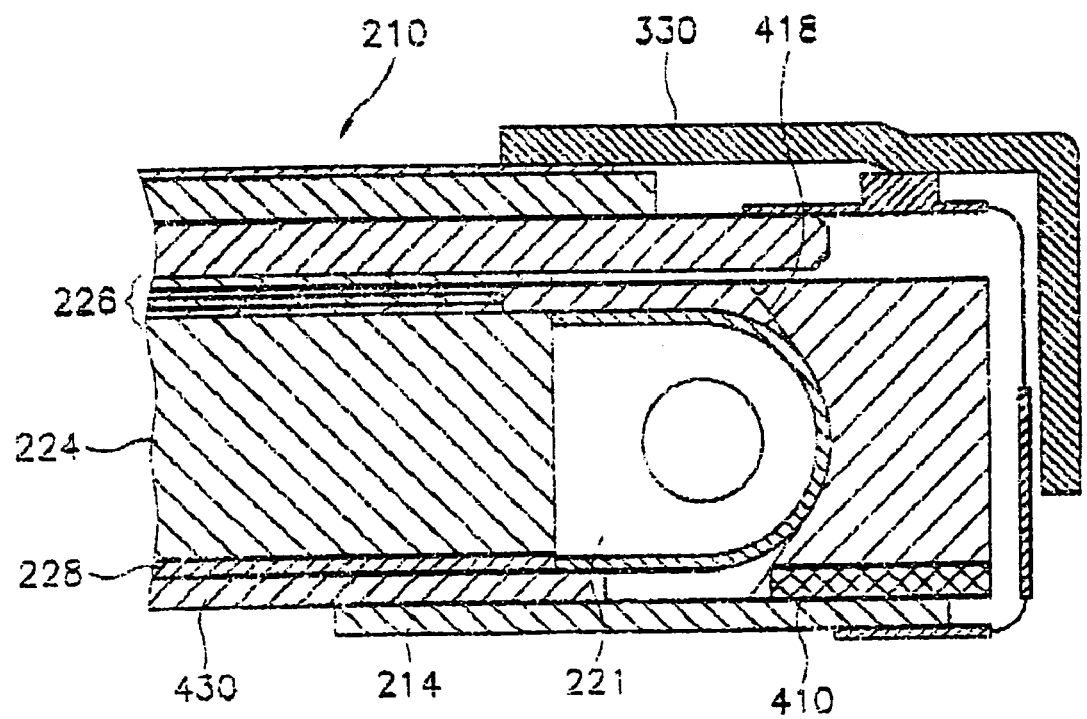

The display unit 210 and the back light assembly 220 are received in the receptacle assembly 400 as shown in FIGS. 11 and 12. Hereinafter, a liquid crystal display unit to which a receptacle assembly according to the first preferred embodiment of the present invention will be explained.

Referring to FIG. 11, a lamp unit 221 comprises a cool cathode ray tube lamp 222, a lamp cover 223 which surrounds the lamp 222, and a power source supplying line (not shown). One end of the power source supplying line is connected to a hot electrode and a cold electrode of the lamp 222, and the other end thereof is engaged with an inverter (not shown).

The lamp unit 221, the back light assembly 220, and the display unit 210 are received in the receptacle assembly 400 as shown in FIGS. 11 and 12. The lamp unit 221 is received in a smooth groove region 418 of the third receptacle 410 of the second receptacle module. The reflection plate 228 and the light guide plate 224 are fixed to the other surface of the lamp unit 221 which is opposite to the groove region 418.

As shown in FIG. 12, after diffusion sheets 226 are placed on the upper surface of the light guide plate 224, the display unit 210 which comprises the thin film transistor substrate 212a, the color filter substrate 212b, and the integrated printed circuit board 214, and the liquid crystal (not shown) is installed on the upper surface of the diffusion sheet 226. The integrated printed circuit board 214 is bent outside of the first receptacle 410 of the second receptacle module, and is installed on the rear surface of the first receptacle module 430. Then, a chassis 330 which has a clamp shape is engaged with the receptacle assembly by using a hook to manufacture the liquid crystal display module 200, the liquid crystal display module 200 is received in the front surface case 310 and the rear surface case 320.

On the other hand, FIGS. 13 to 18 show a receptacle assembly according to the sixth preferred embodiment of the present invention.

Figure 13:
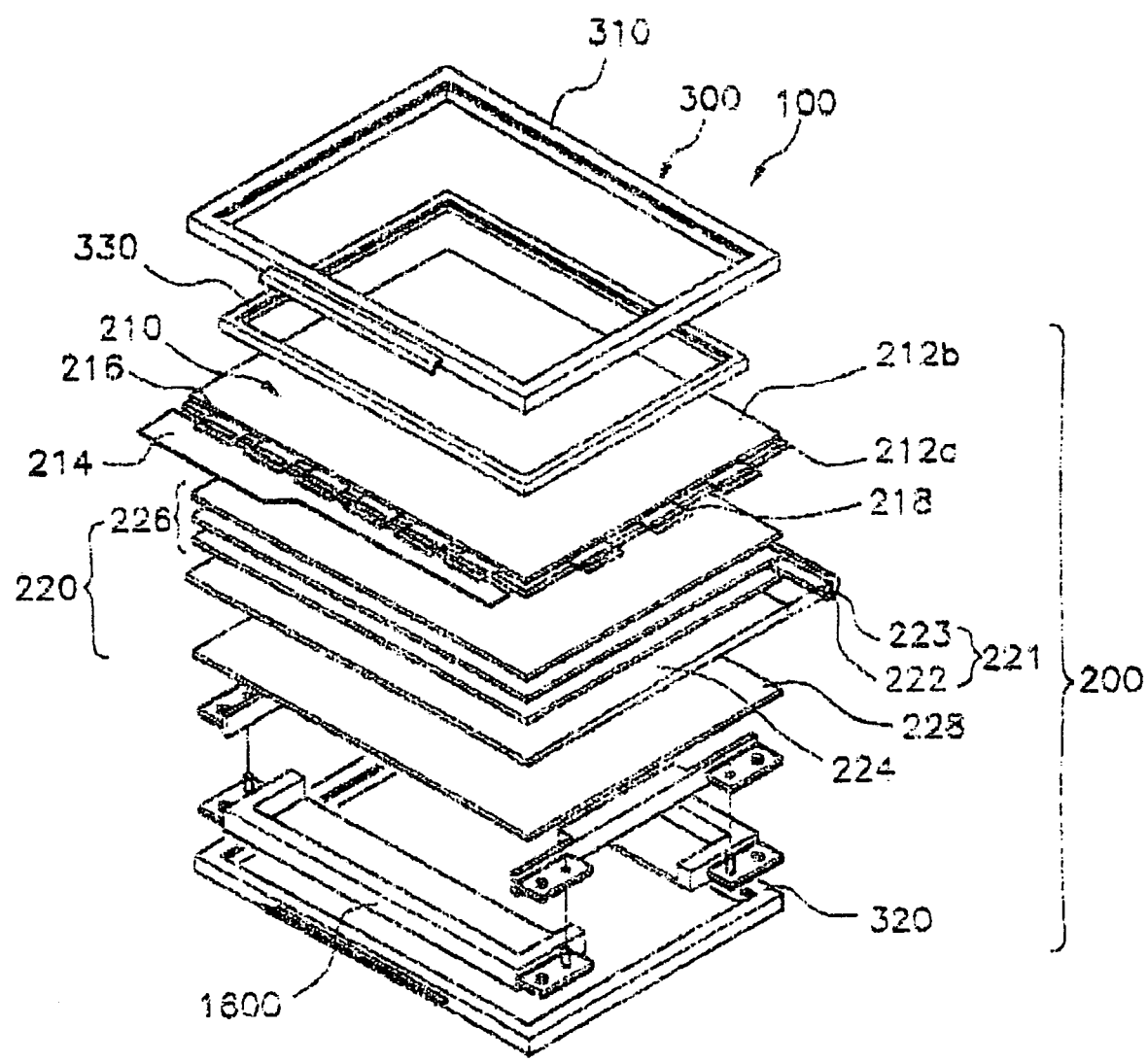
FIG. 13 is a perspective view for showing a liquid crystal display device having a receptacle assembly according to the sixth preferred embodiment of the present invention.

FIG. 13 is an exploded perspective view for showing the liquid crystal display unit having the receptacle assembly according to the sixth preferred embodiment of the present invention. In FIG. 3, the elements that functions as the same elements of the liquid crystal display device according to the first preferred embodiment of the present invention shown in FIG. 3 is indicated by the same numerals. But, in the sixth preferred embodiment of the present invention, a mold frame 1600 which receives the back light assembly 220 and the display unit 210 is indicated by a separate numeral to explain it in detail referring to FIGS. 14 to 18.

Figure 14:
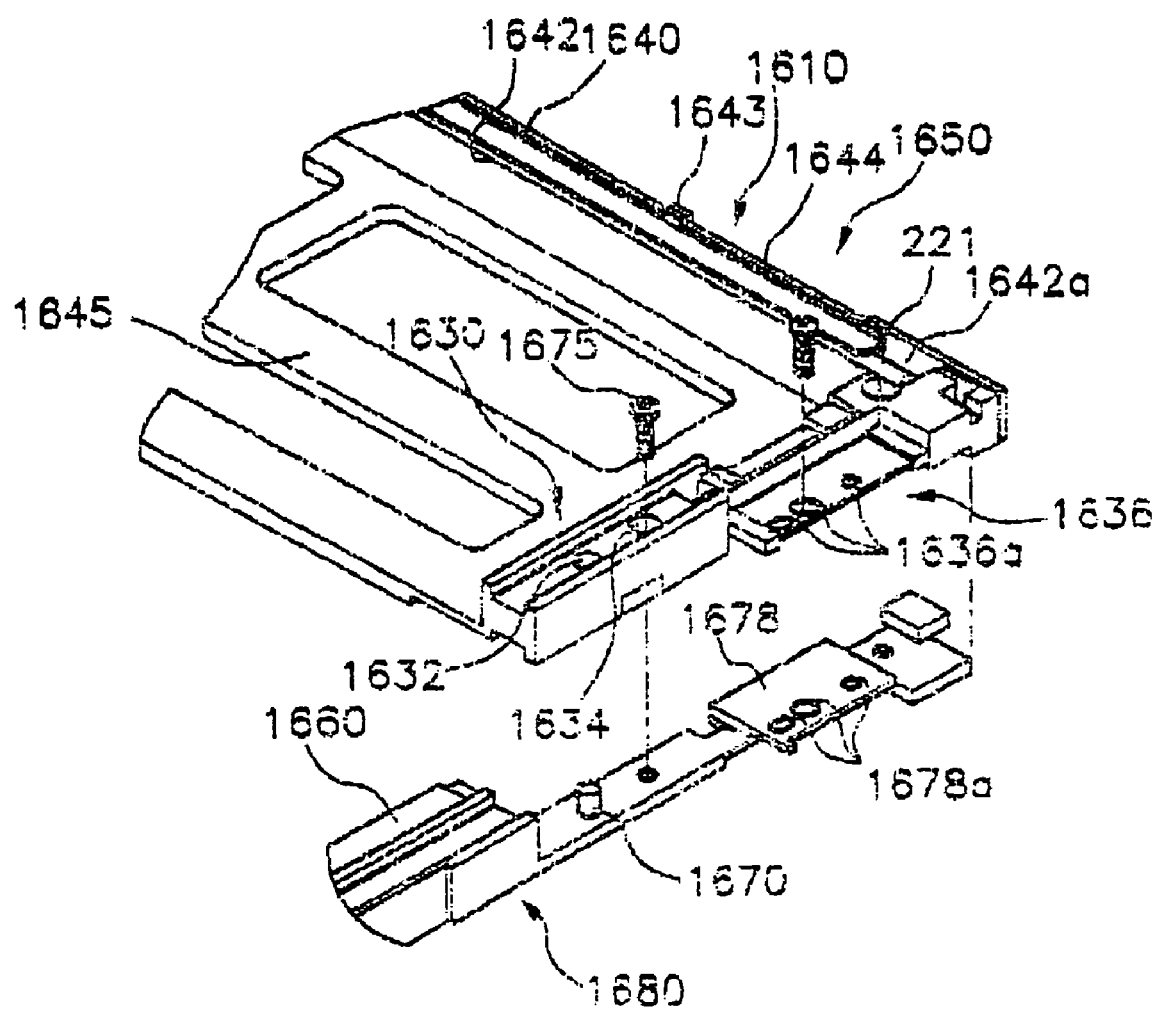
FIG. 14 is an exploded perspective view for showing a portion of the receptacle assembly of FIG. 13.
Figure 15:
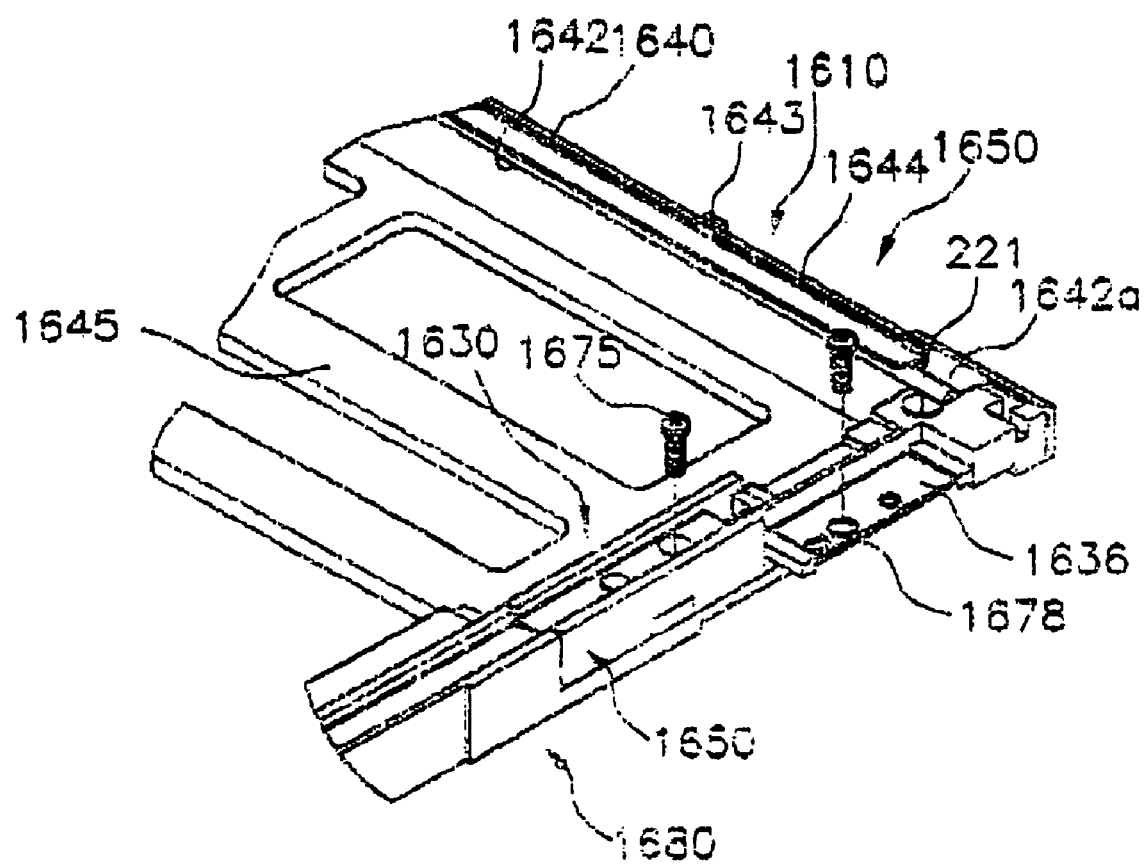
FIG. 15 is a view for showing the engaged state of the receptacle assembly of FIG. 14.
Figure 16:
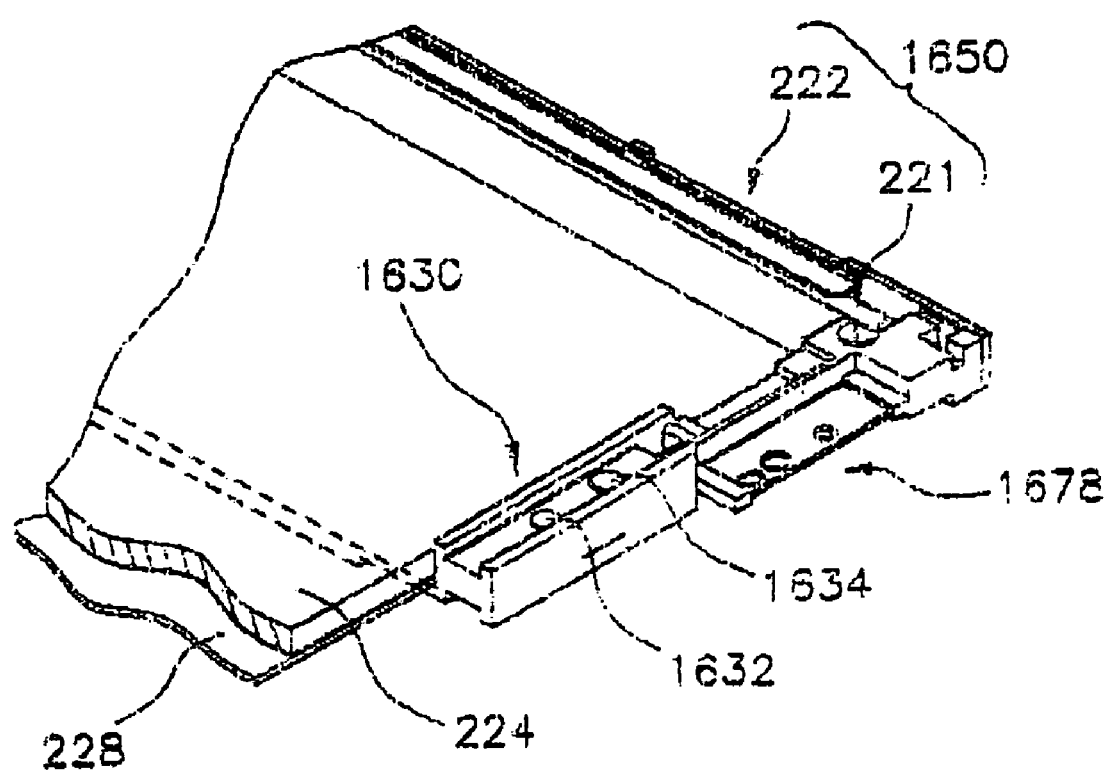
FIG. 16 is a partially cut-off perspective view for showing the state in which a light guide plate and a reflection plate is engaged with a portion of the receptacle assembly of FIG. 14.
Figure 17:
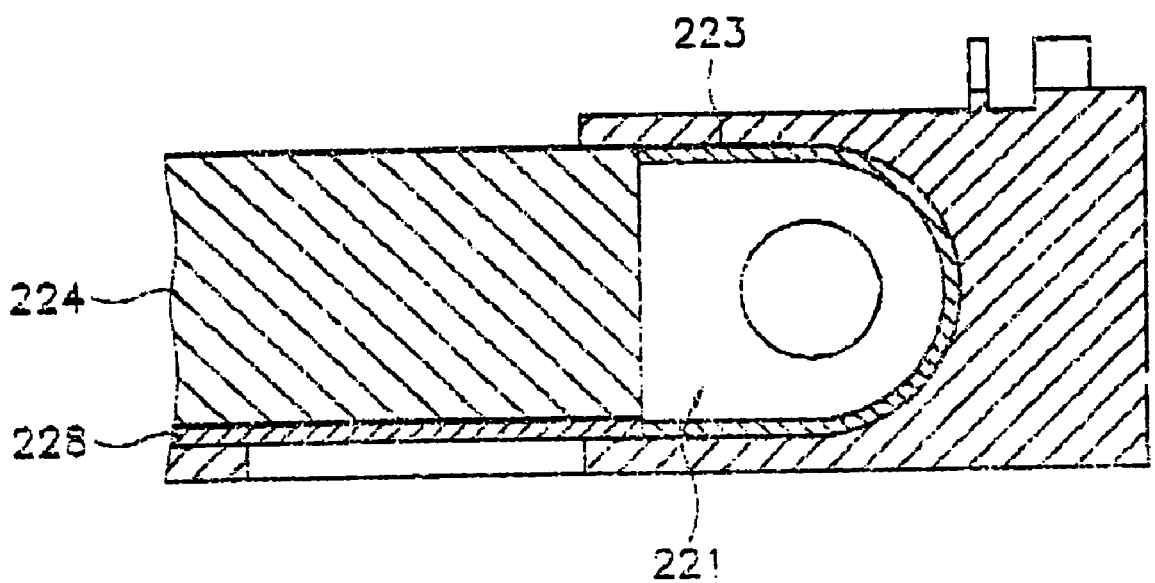
FIG. 17 is a cross-sectional view for showing the state in which a lamp unit is received in the receptacle assembly of FIG. 14.
Figure 18:
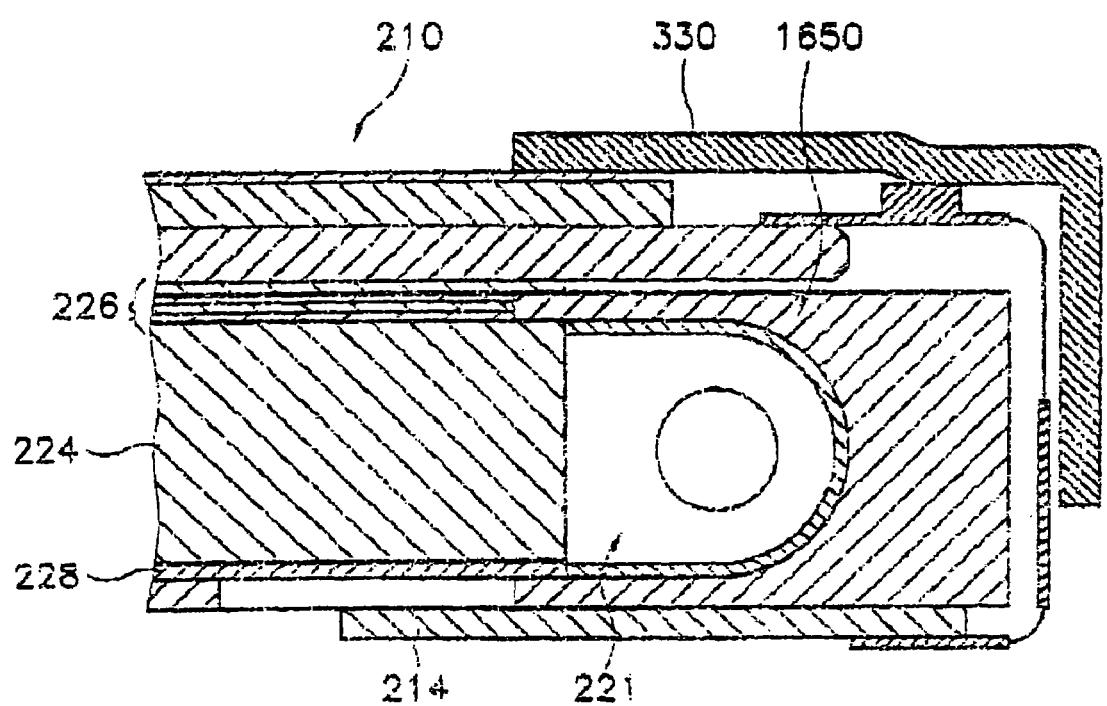
FIG. 18 is a cross-sectional view for explaining the state in which a back light assembly and a display unit is received in the receptacle assembly of FIG. 14.

FIG. 14 is an exploded perspective view for showing the receptacle assembly according to the sixth preferred embodiment of the present invention of FIG. 13, and FIG. 15 is a view for showing the engaging state of the receptacle assembly of FIG. 14, and FIG. 16 is a partially cut-off perspective view for showing the state in which the light guide plate and the reflection plate are engaged with a portion of the receptacle assembly of FIG. 12. FIG. 17 is a cross-sectional view for showing the state in which the back light assembly is received in the receptacle assembly of FIG. 14, and FIG. 18 is a cross-sectional view for showing the state in which the back light assembly and the display unit is received in the receptacle assembly of FIG. 14.

Referring to FIGS. 14 to 16, the receptacle assembly comprises four unit receptacle, and two opposite unit receptacles constitute a pair to define a first receptacle module 1650 and a second receptacle module 1680. The two receptacles of the first receptacle module 1650 has the same structures, and the two receptacles of the second receptacle module 1680 also has the same structures.

The first receptacle module 1650 comprises a first receptacle 1610 and a lamp unit 221. The first receptacle 1610 comprises a first side wall 1630 which has a cubic bar shape of a predetermined length, a second side wall 1640 which has a cubic bar shape of a predetermined length and is perpendicularly formed at one side end portion of the first side wall 1630, a third side wall (not shown) which has a cubic bar shape of a predetermined length and is perpendicularly formed at the other end portion of the second side wall 1640 such that it is opposite to the first side wall 1630, and a bottom plate 1645 which is formed on the bottom surface of the first to third side walls. A receiving recess (not shown) for receiving a printed circuit board is formed on the rear surface of the bottom plate 1645 of the first receptacle 1610.

On the other hand, a lamp unit receiving recess 1642 is formed on the inner side surface of the second side wall 1640 of the first receptacle 1610 from the surface of the second side wall 1640 towards the inner side thereof. A plurality of position restricting bosses 1643 for guiding the position of the display unit 210 is formed on the upper surface of the second side wall 1640.

First and second engaging holes 1632 and 1634 which penetrate the upper surface and the lower surface are formed at the end portions of the first side wall 1630 and the third side wall (not shown) which are formed at both ends of the second side wall 1640. A first protrusion 1636 for mounting the first receptacle 1610 to a rear case 320 is formed at a position which is separated by a distance from the first and second engaging holes 1632 and 1634 of the first side wall 1630 and the third side wall (not shown), and at least one engaging hole 1636a is penetrated through the first protrusion 1636.

The lamp unit 221 is engaged with the first receptacle 1610 to constitute the first receptacle module 1650. The lamp unit 221 is engaged with the lamp unit receiving recess 1642 of the first receptacle 1610. The power supplying line connected to the lamp unit 221 is connected to the inverter (not shown) through an opening 1642a which is communicated with the lamp unit receiving recess 1642.

Both ends of the light guide plate 224 and the reflection plate 228 are inserted into the lamp unit receiving recess 1642 of the first receptacle module 1650. After the light guide plate 224 and the reflection plate 228 are inserted into the lamp unit receiving recess 1644 of the first receptacle module 1650, the second receptacle module 1680 is engaged with the first receptacle module 1650 to constitute the receptacle assembly 1600.

The second receptacle module 1680 has a cubic rod shape, and a support plate 1660 is formed on the inner side surface thereof to position the reflection plate 228. When the first and second receptacle modules 1650 and 1680 are engaged, the end portion of the second receptacle module 1680 is thinner than the other portions of the second receptacle module 1680 to make the total height the same as the first side wall 1630 and the third side wall (not shown) of the first receptacle module 1650. The thickness of the portions engaged with the second receptacle module 1680 in the first side wall 1630 and the third side wall (not shown) of the first receptacle module 1650 is reduced by the thickness of the second receptacle module 1680.

An engaging boss 1670 is formed in the second receptacle module 1680 which corresponds to the first engaging hole 1632 of the first receptacle module 1650. A fixing screw 1675 for fixing the first and second receptacle modules 1650 and 1680 are engaged with the second engaging hole 1634. A second engaging hole 1678 and a third engaging hole 1678a are formed in the second receptacle module 1680 which corresponds to the first protrusion 1636 of the first receptacle module 1650.

As shown in FIGS. 17 and 18, the diffusion sheet 226 and the display unit 210 are sequentially received in the receiving space which is provided by the receptacle assembly 1600 in which the back light assembly 220 is received.

Referring to FIG. 18, the integrated printed circuit board 214 and the data side tape carrier package 216 of the display unit 210 are bent outside of the first receptacle module 1650, and is received in the integrated printed circuit receiving recess (not shown) formed on the bottom surface of the bottom plate 1645 of the first receptacle module 1650. Then, a chassis 330 of a clamp shape is engaged with the receptacle assembly 1600 by a hook, and is received in the front case 310 and a rear case 320.

According to the above-mentioned receptacle assembly and the liquid crystal display device, the receptacle assembly for receiving the back light assembly is comprised of the plurality of side walls and the bottom plate.

Especially, the mold frame of the side in which the lamp unit is received and the side which is opposite to the lamp unit side is formed of a metal, and the mold frame which is engaged with both end portions as a side wall and provides the receiving space is formed of plastic materials.

Therefore, the distortion that can be generated by the exterior impact and the vibration can be prevented, and the deflection due to the heat can be prevented. Further, the productivity is improved by simplifying the engaging structure of the receptacle assembly, and the size stability is improved.

As stated above, preferred embodiments of the present invention are shown and described. Although the preferred embodiments of the present invention have been described, it is understood that the present invention should not be limited to these preferred embodiments but various changes and modifications can be made by one skilled in the art within the spirit and scope of the present invention as hereinafter claimed.

What is claimed is:

1. A liquid Crystal display device, comprising:
   a back light assembly having a light source and a luminance improving device that guides the light;
   a receiver including a first receptacle module composed of a first material and a second receptacle module composed of a second material that is different from the first material to provide a receiving space where the back light assembly is located by engaging the first receptacle module having a first engaging member, a longitudinal direction of the first receptacle module being substantially perpendicular to a longitudinal direction of the second receptacle module; and
   a bottom plate extending from the second receptacle module into the receiving space, the bottom plate having a second engaging member combined with the first engaging member without an intermediate member therebetween, and wherein the second receptacle module comprises a groove shape portion to directly support the back light assembly.

2. The liquid crystal display device of claim 1, wherein the first material comprises metal and the second material comprises plastic.

3. The liquid crystal display of claim 1, wherein the bottom plate contacts the back light assembly.

4. The liquid crystal display device of claim 1, wherein the receiver has an opening at a central portion, and the opening corresponds to an integrated printed circuit board of the liquid crystal display device.

5. The liquid crystal display device of claim 1, wherein the first engaging member comprises an engaging boss and the second engaging member comprises an engaging hole.

6. A liquid crystal display device, comprising:
a back light assembly having a light source and a luminance improving device that guides the light;
a receiver including a first receptacle module composed of a first material and a second receptacle module composed of a second material that is different from the first material to provide a receiving space where the back light assembly is located by engaging the first receptacle module having a first engaging member, a longitudinal direction of the first receptacle module being substantially perpendicular to a longitudinal direction of the second receptacle module; and
a bottom plate extending from the second receptacle module into the receiving space, the bottom plate having a second engaging member combined with the first engaging member without an intermediate member therebetween, and wherein the second receptacle module has a clamp shape.

* * * * *